United States Patent [19]

Kim

[11] Patent Number: 5,796,412
[45] Date of Patent: Aug. 18, 1998

[54] IMAGE DATA STORING METHOD AND PROCESSING APPARATUS THEREOF

[75] Inventor: Jae-Min Kim, Seoul, Rep. of Korea

[73] Assignee: Samsung Electronics Co., Ltd., Rep. of Korea

[21] Appl. No.: 709,567

[22] Filed: Sep. 6, 1996

[51] Int. Cl.⁶ .................................................. G06F 12/06
[52] U.S. Cl. .................. 345/517; 345/521; 345/509; 345/515
[58] Field of Search .................... 345/520, 521, 345/525, 509, 515, 516, 517

[56] References Cited

U.S. PATENT DOCUMENTS

| | | | |
|---|---|---|---|
| 5,347,308 | 9/1994 | Wai | 348/394 |
| 5,488,418 | 1/1996 | Mishima et al. | 348/398 |
| 5,585,863 | 12/1996 | Hackett et al. | 348/716 |
| 5,598,212 | 1/1997 | Moon et al. | 348/403 |
| 5,614,952 | 3/1997 | Boyce et al. | 348/392 |

*Primary Examiner*—Matthew M. Kim
*Assistant Examiner*—U. Chauhan
*Attorney, Agent, or Firm*—Skjerven, Morrill, MacPherson, Franklin, & Friel LLP; David T. Millers

[57] ABSTRACT

An image data storing method and the processing apparatus thereof capable of improving the bandwidth of a data bus. According to the method, an image data of M pixels×N lines is stored in a field memory, which is for use in an image data processing apparatus for processing the image data in the unit of a block of P pixels×P lines (where, P<M,N), in a Q-row zig-zag scan order in such a manner that Q pixel data of the same column of successive Q lines (where, $1 \leq Q \leq P$) are stored in corresponding successive Q addresses of the field memory.

6 Claims, 6 Drawing Sheets

FIG. 2 (PRIOR ART)

| | | | | |
|---|---|---|---|---|
| 0 | I (0, 0) | I (0, 1) | I (0, 2) | I (0, 3) |
| 4 | I (0, 4) | I (0, 5) | I (0, 6) | I (0, 7) |
| 8 | I (0, 8) | I (0, 9) | I (0, 10) | I (0, 11) |
| 12 | I (0, 12) | I (0, 13) | I (0, 14) | I (0, 15) |
| ⋮ | ⋮ | ⋮ | ⋮ | ⋮ |
| M−4 | I (0, M−4) | I (0, M−3) | I (0, M−2) | I (0, M−1) |
| M | I (1, 0) | I (1, 1) | I (1, 2) | I (1, 3) |
| M+4 | I (1, 4) | I (1, 5) | I (1, 6) | I (1, 7) |
| M+8 | I (1, 8) | I (1, 9) | I (1, 10) | I (1, 11) |
| M+12 | I (1, 12) | I (1, 13) | I (1, 14) | I (1, 15) |
| ⋮ | ⋮ | ⋮ | ⋮ | ⋮ |
| 2M−4 | I (1, M−4) | I (1, M−3) | I (1, M−2) | I (1, M−1) |
| 2M | I (2, 0) | I (2, 1) | I (2, 2) | I (2, 3) |
| 2M+4 | I (2, 4) | I (2, 5) | I (2, 6) | I (2, 7) |
| 2M+8 | I (2, 8) | I (2, 9) | I (2, 10) | I (2, 11) |
| 2M+12 | I (2, 12) | I (2, 13) | I (2, 14) | I (2, 15) |
| ⋮ | ⋮ | ⋮ | ⋮ | ⋮ |
| 15M | I (15, 0) | I (15, 1) | I (15, 2) | I (15, 3) |
| 15M+4 | I (15, 4) | I (15, 5) | I (15, 6) | I (15, 7) |
| 15M+8 | I (15, 8) | I (15, 9) | I (15, 10) | I (15, 11) |
| 15M+12 | I (15, 12) | I (15, 13) | I (15, 14) | I (15, 15) |
| ⋮ | ⋮ | ⋮ | ⋮ | ⋮ |
| MN−4 | I (N−1, M−4) | I (N−1, M−3) | I (N−1, M−2) | I (N−1, M−1) |

FIG. 4

| | | | | |
|---|---|---|---|---|
| 0 | I (0, 0) | I (1, 0) | I (0, 1) | I (1, 1) |
| 4 | I (0, 2) | I (1, 2) | I (0, 3) | I (1, 3) |
| 8 | I (0, 4) | I (1, 4) | I (0, 5) | I (1, 5) |
| 12 | I (0, 6) | I (1, 6) | I (0, 7) | I (1, 7) |
| 16 | I (0, 8) | I (1, 8) | I (0, 9) | I (1, 9) |
| 20 | I (0, 10) | I (1, 10) | I (0, 11) | I (1, 11) |
| 24 | I (0, 12) | I (1, 12) | I (0, 13) | I (1, 13) |
| 26 | I (0, 14) | I (1, 14) | I (0, 15) | I (1, 15) |
| ⋮ | ⋮ | ⋮ | ⋮ | ⋮ |
| 2M−4 | I (0, M−2) | I (1, M−2) | I (0, M−1) | I (1, M−1) |
| 2M | I (2, 0) | I (3, 0) | I (2, 1) | I (3, 1) |
| 2M+4 | I (2, 2) | I (3, 2) | I (2, 3) | I (3, 3) |
| 2M+8 | I (2, 4) | I (3, 4) | I (2, 5) | I (3, 5) |
| 2M+12 | I (2, 6) | I (3, 6) | I (2, 7) | I (3, 7) |
| 2M+16 | I (2, 8) | I (3, 8) | I (2, 9) | I (3, 9) |
| 2M+20 | I (2, 10) | I (3, 10) | I (2, 11) | I (3, 11) |
| 2M+24 | I (2, 12) | I (3, 12) | I (2, 13) | I (3, 13) |
| 2M+26 | I (2, 14) | I (3, 14) | I (2, 15) | I (3, 15) |
| ⋮ | ⋮ | ⋮ | ⋮ | ⋮ |
| MN−4 | I (N−2, M−2) | I (N−1, M−2) | I (N−2, M−1) | I (N−1, M−1) |

FIG. 6

| I(0,0), I(0,1), ......, I(0,7) |
| I(0,8), I(0,9), ......, I(0,15) |
| I(1,0), I(1,1), ......, I(1,7) |
| I(1,8), I(1,9), ......, I(1,15) |
| ⋮ |

FIG. 7

| I(0,0), I(0,1), ......, I(0,7) |
| I(0,8), I(0,9), ......, I(0,15) |
| I(0,16), I(0,17), ......, I(0,23) |
| I(0,24), I(0,25), ......, I(0,31) |
| ⋮ |

IMAGE DATA STORING METHOD AND PROCESSING APPARATUS THEREOF

BACKGROUND OF THE INVENTION

1. Field of the Invention

The present invention relates to a method of storing image data and an apparatus for processing the image data. In particular, the present invention relates to an image data storing method and the processing apparatus thereof which can improve the bandwidth of a data bus by applying an improved image data storing order in processing the image data.

2. Description of the Prior Art

Motion pictures and still pictures require a large amount of data to be processed, and dynamic random access memories (DRAMs) or synchronous DRAMs (SDRAMs) are used in processing such data. Especially, in the multimedia application fields, great memory bandwidth is required, and thus SDRAMs and/or extended data output (EDO)-DRAMs are generally used for this purpose. One field of image data is commonly stored in a field memory in a raster scan order as shown in FIG. 1. The storage state of the one-field image data in a field memory having a data bus of 32 bits is shown in FIG. 2. However, such an image data storing method has problems in that advantages for the burst mode data read/write operation in 16×16 or 8×8 block-based coding of an H261, H263, MPEG1, or MPEG2 system are not effectively achieved.

For instance, in the event that the basic image processing unit is a macro block of 16×16 pixel data, and the data bus of the SDRAM is composed of 32 bits, the image data, as shown in FIG. 2, is stored in a raster scan order in such a manner that four rows of 8-bit successive pixel data I(0,0), I(0,1), I(0,2), and I(0,3) arranged in a horizontal direction are stored in corresponding successive addresses of the field memory. Accordingly, the image data corresponding to a macro block of 16×16 pixels is stored in the memory region arranged in four rows as shown in FIG. 2. In order to read the image data stored as above, the maximum burst mode will be "4", which has smaller memory bandwidth than a burst mode of 8 or 16, and this deteriorates the efficiency of the data reading operation. Also, this causes the performance of the system in the processing speed of the image data to be limited.

SUMMARY OF THE INVENTION

It is an object of the present invention to solve the problems involved in the prior art, and to provide an image data storing method and the processing apparatus thereof which can improve the bandwidth of a data bus by applying an improved image data storing order in processing the image data, thereby providing an easiness to a following image data process.

In order to achieve the above object, there is provided a method of storing an image data of M pixels×N lines in a field memory for use in an image data processing apparatus for processing said image data in the unit of a block of P pixels×P lines (where, P<M,N), the method comprising the step of storing said image data in said field memory in a Q-row zig-zag scan order in such a manner that Q pixel data of the same column of successive Q lines (where, 1≦Q≦P) are stored in corresponding successive Q addresses of said field memory.

In another aspect of the present invention, there is provided an image data processing apparatus comprising: signal processing means for performing an image data compression and decompression, pre- and post-processing said image data, and displaying said image data, respectively; a field memory for storing said image data in a plural-row zig-zag scan order; and memory control means coupled to said signal processing means through a first data bus, and coupled to said field memory through a second data bus, said memory control means reading out said image data from said field memory, storing said readout image data in a buffer memory through said second data bus in an order suitable for an signal processing algorithm adopted in said signal processing means, and then transmitting said image data stored in said buffer memory to said signal processing means through said first data bus.

BRIEF DESCRIPTION OF THE DRAWINGS

The above object, and other features and advantages of the present invention will become more apparent by describing the preferred embodiment thereof with reference to the accompanying drawings, in which:

FIG. 2 is a view explaining the image data storage state of a field memory according to a conventional raster scan order;

FIG. 4 is a view explaining the image data storage state of a field memory according to the two-row zig-zag scan order according to the present invention;

FIG. 6 is a view explaining the order of image data stored in a buffer memory in processing the image data of a 16×16 pixel block in accordance with the present invention; and FIG. 7 is a view explaining the order of image data stored in a buffer memory in displaying the image data in accordance with the present invention.

DETAILED DESCRIPTION OF PREFERRED EMBODIMENT

Figure 1:
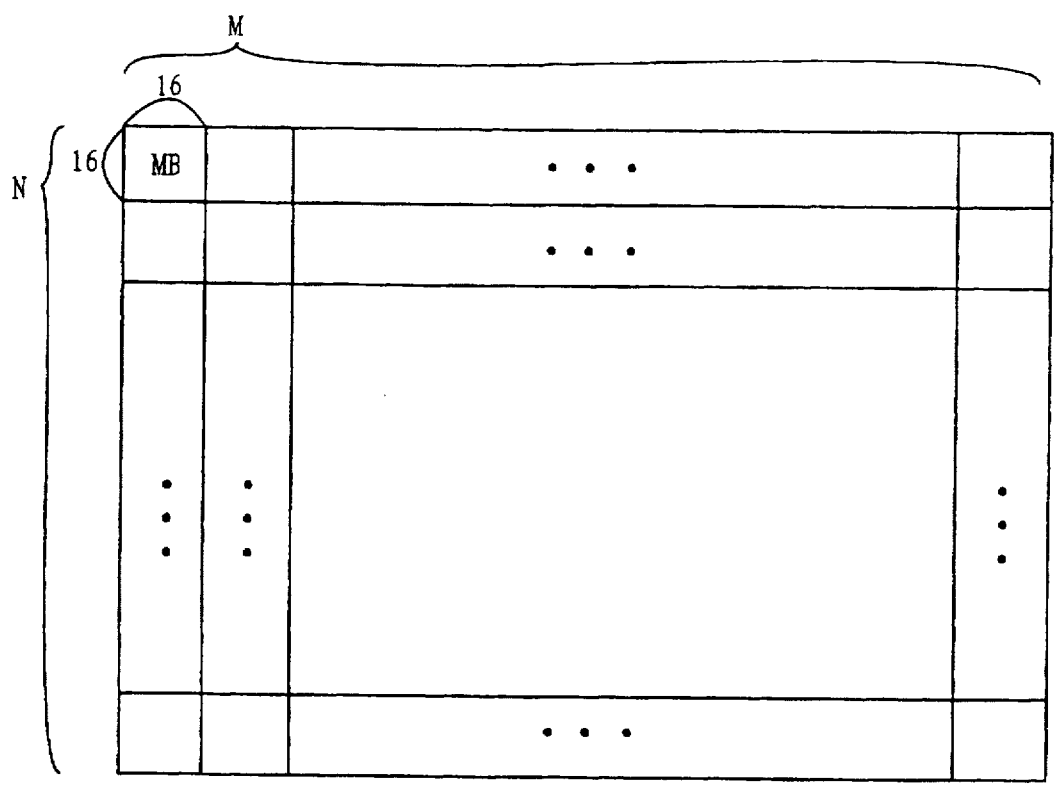
FIG. 1 is a view illustrating the structure of image data of one field.
Figure 3:
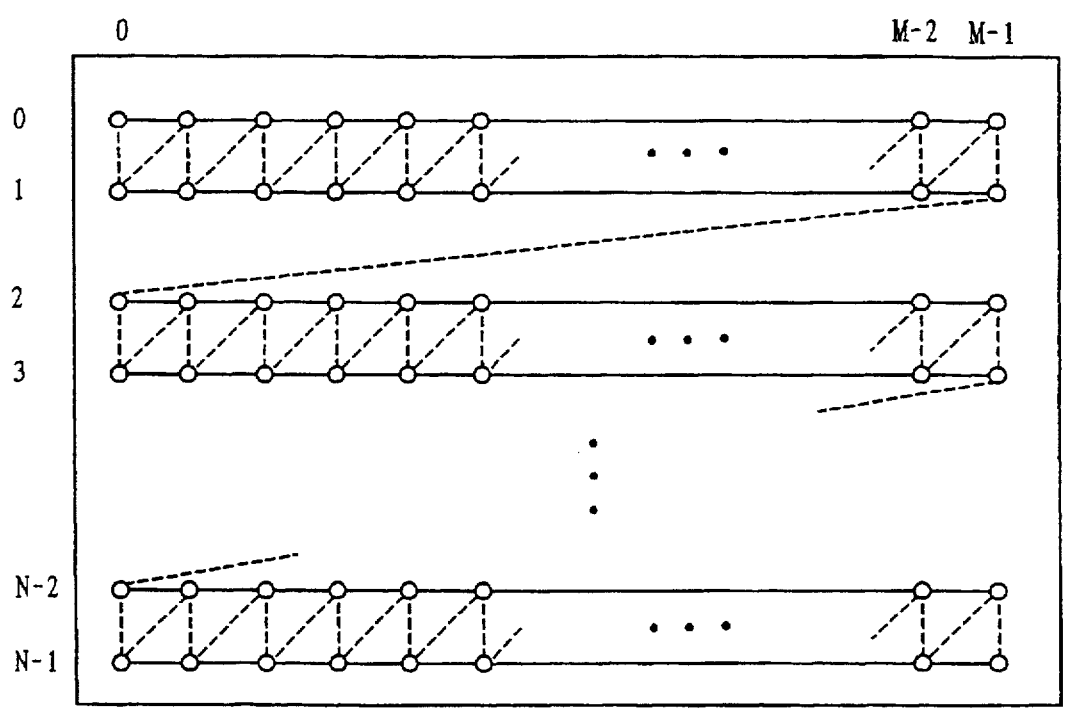
FIG. 3 is a view explaining the two-row zig-zag scan order according to the present invention.

Referring to FIG. 3, in the embodiment of the present invention, two pixel data of the same column of successive two rows are stored in successive addresses of a field memory which is composed of an SDRAM or EDO-DRAM having a 32-bit data bus. Accordingly, the pixel data I(0,0) and I(1,0) are stored in the successive addresses of the memory.

Specifically, the image data are stored in the memory in two-row zig-zag scan order as shown in FIG. 4. Thus, the image data of a 16×16 macro block are successively stored in an array of 4 columns×8 rows. This storage state enables the burst mode of 8. Accordingly, the present storage method enables the burst mode of 8 in comparison to the conventional storage method in the raster scan order which enables the burst mode of 4, and thereby the memory bandwidth will be increased.

In the same manner, storing in a 4-row zig-zag scan order image data in a memory having a 32-bit data bus enables the burst mode of 16, while storing in a 8-row or 16-row zig-zag scan order enables the burst mode of 32 or 64.

As a result, according to the present invention, the image data is not stored in a conventional raster scan order but is stored in an improved scan order as described above to utilize the performance of the memory in maximum, thereby improving the bandwidth of the memory in a read operation of the image data stored in the memory.

Further, according to the present invention, the data readout from the field memory is stored in a buffer memory in a memory control section so as to be suitable for the signal processing algorithm of a signal processing section to improve the performance of the image data processing apparatus.

Figure 5:
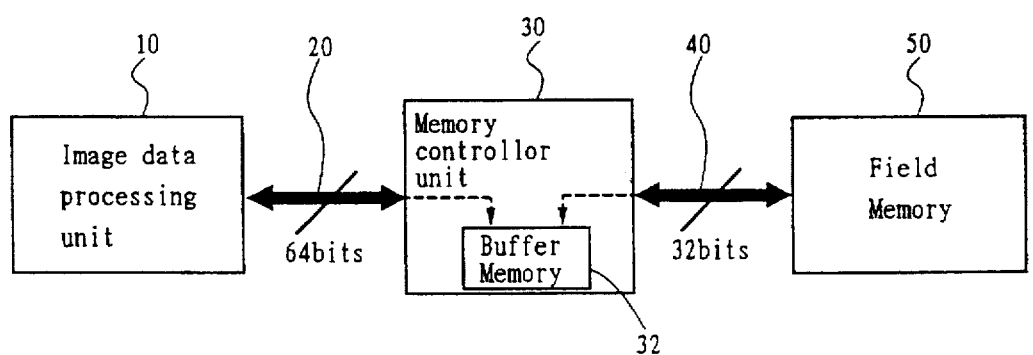
FIG. 5 is a block diagram of the image data processing apparatus according to the present invention.

Referring to FIG. 5, the image data processing apparatus according to the present invention includes a signal processing section 10 for performing image data compression and decompression, pre-processing and post-processing the image data, and displaying the image data; a field memory 50 for storing the image data in a plural-row zig-zag scan order; and a memory control section 30, coupled to the signal processing section through a first data bus 40 and coupled to the field memory 50 through a second data bus 40, for reading out the image data from the field memory 50, storing the readout image data in a buffer memory 32 through the second data bus 40, and transmitting the image data stored in the buffer memory 32 to the signal processing section 10 through the first data bus 20.

The first data bus 20 is composed of 64 bits in accordance with the performance of the signal processing section 10, and the second data bus 40 is composed of 32 bits corresponding to the data lines of the field memory 50. In this case, each bandwidth of the first data bus and the second data bus is different from each other, and thus the buffer memory 32 should be employed in the memory control section 30.

For instance, in the event that the display process of the image data is to be performed by the signal processing section 10, the data readout from the field memory 50 is stored in the buffer memory 32 in the raster scan order such as I(0,0), I(0,1), . . . . I(0,7), I(0,8), I(0,9), . . . . I(0,15), I(0,16), . . . , I(0,23), I(0,24), . . . , I(0,31) as shown in FIG. 7. In the event that the image data is to be processed in the unit of a block by the signal processing section 10, the data read out from the field memory 50 is stored in the buffer memory 32 in a block structure order such as I(0,0), I(0,1), . . . . I(0,7), I(0,8), I(0,9), . . . .. I(0,15), I(1,0), I(1,1), . . . . I(1,7), I(1,8), I(1,9), . . . , I(1,15) as shown in FIG. 6.

Consequently, the image data is provided from the buffer memory 32 to the signal processing section 10 so as to be suitable for the signal processing algorithm adopted to the signal processing section 10, and thus the bandwidth of the data bus is increased, resulting in the improvement of the signal processing performance.

In case of the advanced motion compensation of the H263 system, the comparison results of the performance of the conventional method and the present method in processing the image data of a macro block are as follows:

* The amount of data required for motion compensation
  a present macro block: 16×16, 8×8
  six previous blocks : 6×8×8

* Read data for the storage method in the raster scan order
  1. Burst mode of 4: 16×16+8×16+6×8×16
  2. Burst mode of 8: 16×32+8×32+6×8×32

* Read data for the storage method in the two-row zig-zag scan order according to the present invention
  3. Burst mode of 8: 8×(2×16)+4×(2×16)+6×4×(2×16)

In the event that the operating frequency is 100 MHz and the RAS & CAS delay cycles are six cycles, the bandwidths of the above described cases of 1, 2, and 3 are given by the following table 1.

TABLE 1

| | Required Data/Macro Block | Bandwidth (Mb) |
|---|---|---|
| 1 | 72 × 16 | 160 |
| 2 | 144 × 16 | 228 |
| 3 | 72 × 16 | 228 |

While the present invention has been described and illustrated herein with reference to the preferred embodiment thereof, it will be understood by those skilled in the art that various changes in form and details may be made therein without departing from the spirit and scope of the invention.

What is claimed is:

1. A method of storing an image data of M pixels×N lines in a field memory for use in an image data processing apparatus for processing said image data in the unit of a block of P pixels×P lines (where, P<M,N), the method comprising the step of storing said image data in said field memory in a Q-row zig-zag scan order in such a manner that Q pixel data of the same column of successive Q lines (where, $1 \leq Q \leq P$) are stored in corresponding successive Q addresses of said field memory.

2. A method of storing an image data as claimed in claim 1, wherein said P is 16, and said Q is one among 2, 4, 8, and 16.

3. A method of storing an image data as claimed in claim 1, wherein said field memory comprises one of an SDRAM and an EDO-DRAM having a burst mode of 2, 4, 8, 16, 32, or 64.

4. An image data processing apparatus comprising:

signal processing means for performing image data compression and decompression, pre- and post-processing said image data, and displaying said image data, respectively;

a field memory for storing said image data in a plural-row zig-zag scan order; and memory control means coupled to said signal processing means through a first data bus, and coupled to said field memory through a second data bus, said memory control means reading out said image data from said field memory, storing said readout image data in a buffer memory through said second data bus in an order suitable for an signal processing algorithm adopted in said signal processing means, and then transmitting said image data stored in said buffer memory to said signal processing means through said first data bus.

5. An image data processing apparatus as claimed in claim 4, wherein in the event that a data display process is to be performed by said signal processing means, said image data read out from said field memory is stored in said buffer memory in a raster scan order.

6. An image data processing apparatus as claimed in claim 4, wherein in the event that said image data is to be processed in the unit of a block by said signal processing means, said image data read out from said field memory is stored in said buffer memory in a block structure order.

* * * * *